United States Patent
Jeng et al.

(10) Patent No.: US 10,019,545 B2
(45) Date of Patent: Jul. 10, 2018

(54) SIMULATION SCHEME INCLUDING SELF HEATING EFFECT

(71) Applicant: Taiwan Semiconductor Manufacturing Company, Ltd., Hsin-Chu (TW)

(72) Inventors: Min-Chie Jeng, Taipei (TW); Chung-Kai Lin, Taipei (TW); Ke-Wei Su, Zhubei (TW); Yi-Shun Huang, Hsin-Chu (TW); Ya-Chin Liang, Tainan (TW); Cheng Hsiao, Hsin-Chu (TW); Juan Yi Chen, Hsin-Chu (TW); Wai-Kit Lee, N.T. (HK)

(73) Assignee: Taiwan Semiconductor Manufacturing Company, Hsin-Chu (TW)

( * ) Notice: Subject to any disclaimer, the term of this patent is extended or adjusted under 35 U.S.C. 154(b) by 967 days.

(21) Appl. No.: 14/304,499

(22) Filed: Jun. 13, 2014

(65) Prior Publication Data
US 2015/0363526 A1    Dec. 17, 2015

(51) Int. Cl.
*G06F 17/50*    (2006.01)

(52) U.S. Cl.
CPC ...... *G06F 17/5036* (2013.01); *G06F 17/5068* (2013.01); *G06F 2217/80* (2013.01)

(58) Field of Classification Search
CPC ............. G06F 17/5036; G06F 17/5068; G06F 2217/80
See application file for complete search history.

(56) References Cited

U.S. PATENT DOCUMENTS

| | | | | |
|---|---|---|---|---|
| 7,606,693 | B2 * | 10/2009 | Jeng ..................... | G06F 17/5036 703/14 |
| 8,286,111 | B2 * | 10/2012 | Chandra ................. | G01K 7/425 716/110 |
| 8,332,190 | B2 | 12/2012 | Tanomura et al. | |
| 8,972,913 | B1 * | 3/2015 | Samoylov ........... | G06F 17/5009 703/14 |
| 2007/0033555 | A1 * | 2/2007 | Banoo ................. | G06F 17/5036 716/115 |
| 2009/0019411 | A1 * | 1/2009 | Chandra ............. | G06F 17/5009 716/119 |

(Continued)

OTHER PUBLICATIONS

Chiang, Ting-Yen, et al. Compact Modeling and SPICE-Based Simulation for Electrothermal Analysis of Multilevel ULSI Interconnects. Proceedings of the 2001 IEEE/ACM international conference on Computer-aided design. IEEE Press, 2001, pp. 165-172 [online], [retrieved on Mar. 21, 2017]. Retrieved from <http://dl.acm.org/citation.cfm?id=603128>.*

(Continued)

*Primary Examiner* — Kamini S Shah
*Assistant Examiner* — Alfred Wechselberger
(74) *Attorney, Agent, or Firm* — Slater Matsil, LLP

(57) ABSTRACT

A method includes receiving input information related to devices of an integrated circuit. A first simulation of the integrated circuit is performed over a first time period. Average temperature changes of the devices over the first time period are calculated. A second simulation of the integrated circuit is performed over a second time period using the average temperature changes of the devices. The first simulation and the second simulation are executed by a processor unit.

17 Claims, 6 Drawing Sheets

(56) References Cited

U.S. PATENT DOCUMENTS

| | | | | |
|---|---|---|---|---|
| 2009/0224356 A1* | 9/2009 | Chandra | ............ | G06F 17/5009 257/499 |
| 2012/0016639 A1* | 1/2012 | Duan | ................. | G06F 17/5018 703/1 |
| 2012/0053913 A1* | 3/2012 | Xie | ..................... | G06F 17/5018 703/2 |

OTHER PUBLICATIONS

Grey, Paul, et al. Analysis of Electrothermal Integrated Circuits. IEEE Journal of Solid-State Circuits, vol. SC-6, No. 1, Feb. 1971, pp. 8-14 [online], [retrieved on Mar. 21, 2017]. Retrieved from <http://ieeexplore.ieee.org/stamp/stamp.jsp?arnumber=1050152>.*

Banerjee, Kaustav, et al. On Thermal Effects in Deep Sub-Micron VLSI Interconnects. Proceedings 1999 Design Automation Conference (Cat. No. 99CH36361), New Orleans, LA, 1999, pp. 885-891 [online], [retrieved on Mar. 21, 2017]. Retrieved from <http://ieeexplore.ieee.org/stamp/stamp.jsp?arnumber=782207>.*

"Weighted Mean." Wolfram MathWorld: Web Resources, Mar. 20, 2014 [online], [retrieved on Mar. 20, 2017]. Retrieved from <https://web.archive.org/web/20140325172536/http://mathworld.wolfram.com/WeightedMean.html>.*

Goplen, et al. "Efficient Thermal Placement of Standard Cells in 3D ICs using a Force Directed Approach" Proceedings of the 2003 IEEE/ACM International Conference on Computer-aided design (ICCAD 2003) [retrieved on Mar. 20, 2017]. Retrieved from <https://dl.acm.org/ft_gateway.cfm?id=1009873&ftid=286770&dwn=1&CFID=11029987&CFTOKEN=78d5d90e62422c02-54>.*

Maas, S. A., "III Conditioning in Self-Heating FET Models", IEEE Microwave and Wireless Components Letters, vol. 12, Issue 3, Mar. 2002, pp. 88-89, IEEE, Long Beach, Califonia, USA.

* cited by examiner

SIMULATION SCHEME INCLUDING SELF HEATING EFFECT

BACKGROUND

The semiconductor integrated circuit (IC) industry has experienced rapid growth. Technological advances in IC materials and design have produced generations of ICs where each generation has smaller circuits than the previous generation. In the course of integrated circuit evolution, the number of interconnected devices per chip area has generally increased while geometry size (i.e., the smallest component (or line) that can be created using a fabrication process) has decreased.

This scaling down process generally provides benefits by increasing production efficiency and lowering associated costs. Such scaling-down also produces relatively high power dissipation. Such power dissipation generates heat and temperature increase of devices. A simulation method and system to accurately and efficiently simulate the IC operation is desirable.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
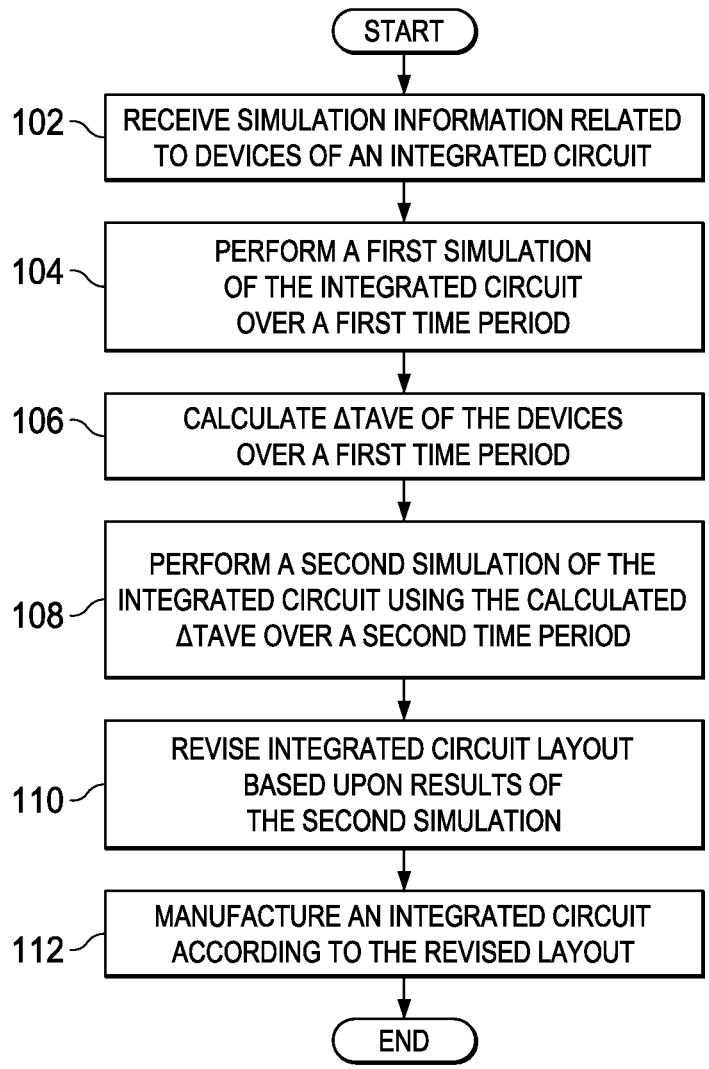
FIG. 1 is an exemplary flowchart of performing a simulation including self-heating effect in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

When a device in an IC is conducting an electrical current (Id) at a voltage (Vd), it consumes power corresponding to the current and voltage (|Vd×Id|). The power dissipates in the form of heat. If the heat cannot be removed effectively, it increases the device temperature. Some of the heat associated with certain devices, e.g., a planar Metal-Oxide-Semiconductor Field-Effect Transistor (MOSFET), can be dissipated through the substrate.

However, as the device size in the integrated circuit is decreasing, the self-generated heat of some devices can be confined in a small volume, thus the self-generated heat can affect the device temperature. For example, FinFET and silicon-on-insulator (SOI) structures may hold the heat in the confined device areas. The impact of such self-heating can affect not only the electrical characteristics, such as electron mobility, direct current (DC), or noise properties, but also device reliability. Thus, a simulation method and system to accurately and efficiently simulate the IC operation including such self-generated heat is desirable.

Figure 2:
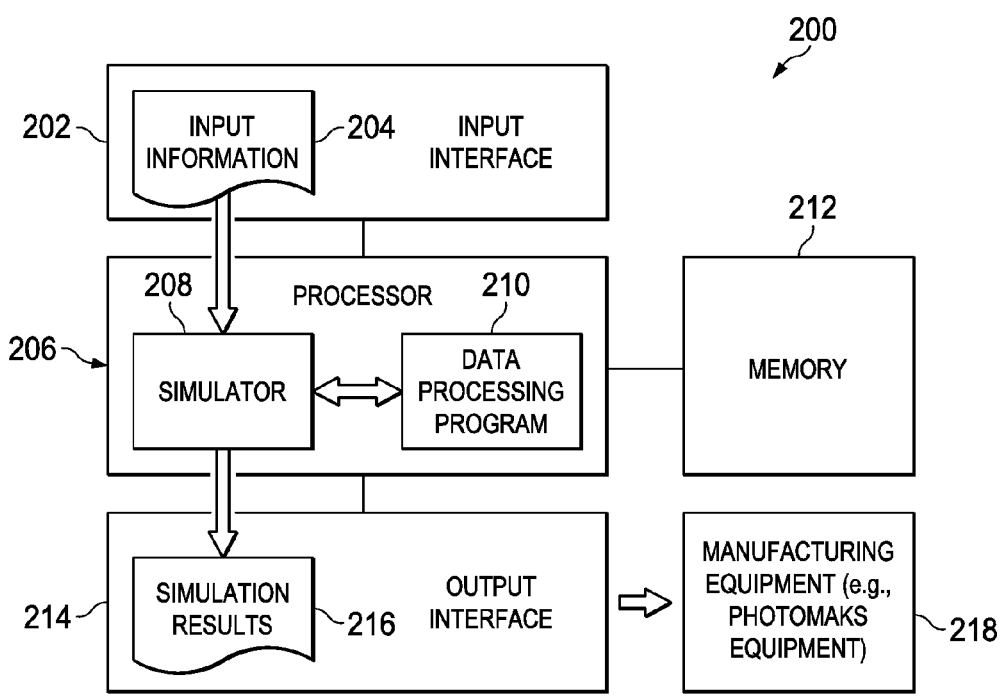
FIG. 2 is an exemplary block diagram of a system for performing the simulation of FIG. 1 including self-heating effect in accordance with some embodiments.

FIG. 1 is an exemplary flowchart of performing a simulation including self-heating effect in accordance with some embodiments. FIG. 2 is an exemplary block diagram of a system for performing the simulation of FIG. 1 including self-heating effect in accordance with some embodiments. In the description of FIG. 1 below, FIG. 2 is also referenced.

At step 102, input information 204 related to devices of an integrated circuit (IC) to be simulated is received using an input interface unit 202. The input interface unit 202 can be a keyboard, a card reader, a CD-ROM drive, a USB drive reader, or any other suitable input device. The input information 204 is stored in at least one input file in some embodiments. In other embodiments, the input information 204 can be received interactively by typing in the information, for example. In the following, it is assumed that at least one input file is received for the input information, and is also referred to as input file 204.

In some embodiments, the at least one input file 204 includes a model file and a connectivity file. The model file defines behaviors of the devices, such as current and voltage input/output. In some embodiments, a library including behaviors of the devices can be used. The connectivity file defines connections of the devices and also includes information about what to simulate, such as alternating current (AC), direct current (DC), transient, noise, etc. in some embodiments. The model file and the connectivity file can be combined into one input file in some embodiments.

The connectivity file can specify the model file name and/or a library file name in some embodiments. The connectivity file includes information about data processing program 210 (e.g., a computer program), such as file name and whether the data processing program 210 will be used in the simulation in some embodiments. The data processing program 210 calculates an average temperature change. The data processing program 210 is separate from a simulator 208 (e.g., a computer program) in some embodiments. For example, the simulator 208 can be a commercially available simulation program and the data processing program can be a customized program. An example of the connectivity file is described later in the present disclosure.

At step 104, a first simulation of the integrated circuit is performed over a first time period using the simulator 208 and executed by a processor unit 206. A simulator 208 such as Simulation Program with Integrated Circuit Emphasis (SPICE) or any other suitable simulation program can be used for the first simulation. The simulator 208 is executed in the processor unit 206 and the simulator 208 can be encoded in a computer-readable medium such as a hard disk, or can be accessed online via an internet in some embodiments. The simulator 208 has access to memory 212 to store data in some embodiments.

Figure 3A:
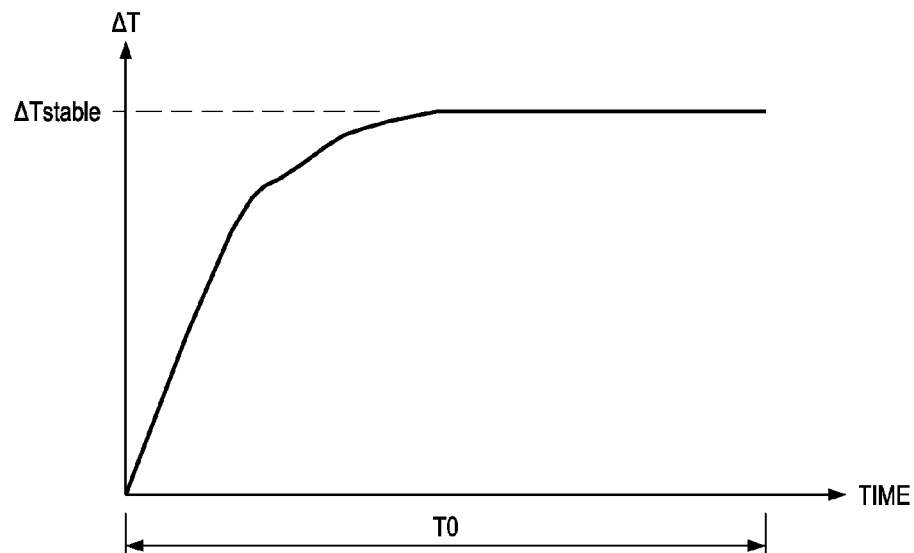
FIG. 3A is a plot showing a temperature change ΔT of an exemplary device over a time period T0 in accordance with some embodiments.

The first time period is set to provide sufficient time to reach a stable temperature for devices in the IC in some embodiments. For example, FIG. 3A is a plot showing a temperature change ΔT of an exemplary device over a time period T0 in accordance with some embodiments. As shown, the temperature change ΔT of a device has reached a stable value ΔTstable within the time period T0. The specific time T0 is dependent on each specific device. In one example, T0 is chosen as 500 ns, and T0 can be a different time period in other examples. The first simulation data and results are stored in the memory 212 for further processing in some embodiments.

At step 106, first average temperature changes ΔTave of the devices over the first time period are calculated. The first average temperature change ΔTave is calculated for each device in the IC. In some embodiments, the data processing program 210 arranged to calculate an average temperature change ΔTave is separate from the simulator 208. Thus, in some embodiments, the simulator 208 does not have a simulation module for the temperature change. The data processing program 210 is executed in the process unit 206 and the data processing program 210 can be encoded in a computer-readable medium such as a hard disk, or can be accessed online via an internet in some embodiments. In other embodiments, the data processing program 210 arranged to calculate an average temperature change ΔTave can be incorporated to the simulator 208. The average temperature change ΔTave for each device is stored in the memory 212 for further processing in some embodiments.

In some embodiments, the time period of the simulation is divided into n sections, where n is a positive integer. In some embodiments, the average temperature change ΔTave is calculated for each device according to the following equation:

$$\Delta Tave = \left( \frac{\sum_{i=1}^{n} I_i \cdot V_i \cdot \Delta t_i}{\sum_{i=1}^{n} \Delta t_i} \right) \times Rth, \quad \text{Equation (1)}$$

where ΔTave is the average temperature change, Δti is an i-th time section, Ii is an i-th current value, Vi is an i-th voltage value, and Rth is a constant with a unit of ° C./W. Rth is determined from simulations or measurements in some embodiments. Different technologies and/or different devices can have different values of Rth and ΔTave. For example, Rth can vary from 0 to 1.0E6° C./W. Also, ΔTave depends on the IC design in some embodiments.

To calculate ΔTave according to Equation (1), the first simulation data from the simulator 208 is sent to the data processing program 210 in some embodiments. The simulation data can be sent to the data processing program 210 at each time step $t_0, t_1, t_2, \ldots, t_n$, or can be sent to the data processing program 210 after the first simulation is complete in some embodiments. To show how to calculate the average temperature change ΔTave according to Equation (1), FIG. 3B and FIG. 3C are described below.

Figure 3B:
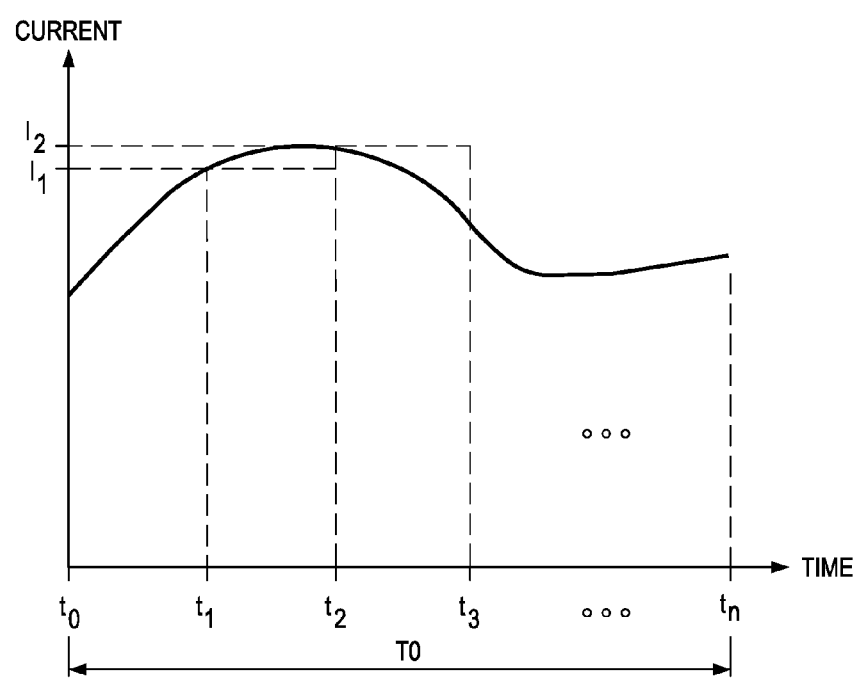
FIG. 3B is a plot showing an exemplary current change of a device over a time period T0 in accordance with some embodiments.
Figure 3C:
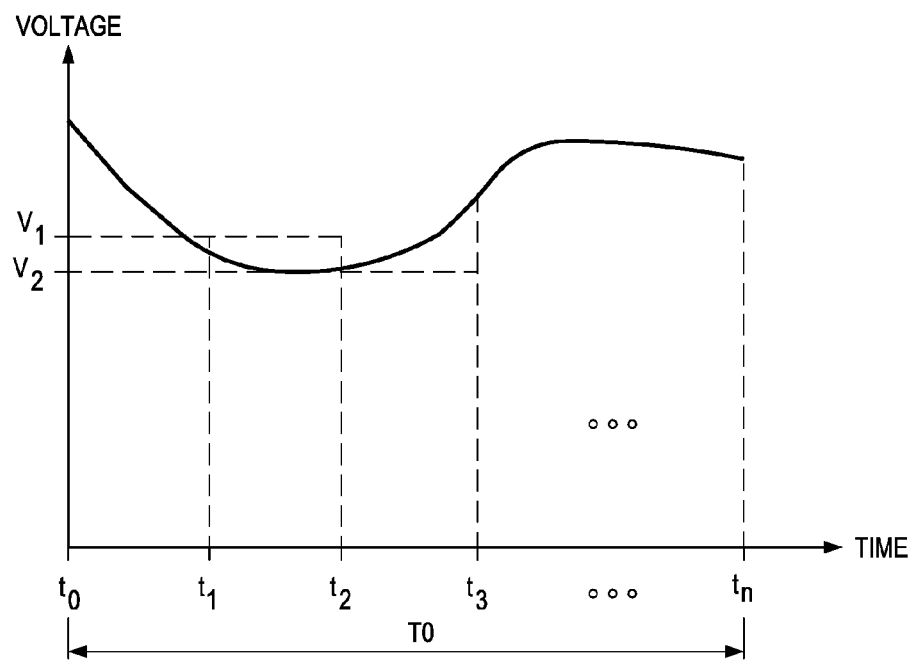
FIG. 3C is a plot showing an exemplary voltage change of the device over a time period T0 in accordance with some embodiments.

FIG. 3B is a plot showing an exemplary current change of a device over a time period T0 illustrated in FIG. 3A, and FIG. 3C is a plot showing an exemplary voltage change of the device over a time period T0 illustrated in FIG. 3A in accordance with some embodiments. The current in FIG. 3B and the voltage in FIG. 3C are shown with simulated values from the first simulation. The time period T0 is divided into n-sections (n is a positive integer number). In some embodiments, n=T0/(simulation time step). The simulation time step can be defined by the user. In some embodiments, n can be determined by the simulator 208. At time $t_1$, the corresponding current of the device is $I_1$ and the corresponding voltage of the device is $V_1$. At time $t_2$, the corresponding current of the device is $I_2$ and the corresponding voltage of the device is $V_2$, and so on. The first time interval $\Delta t_1 = t_1 - t_0$, the second time interval $\Delta t_2 = t_2 - t_1, \ldots$, and the n-th time interval $\Delta t_n = t_n - t_{(n-1)}$.

During or after the first simulation performed by the simulator 208, the voltage and current values of each device are sent from the simulator 208 to the data processing program 210 to calculate first average temperature changes ΔTave of devices in the simulated IC according to Equation (1) in some embodiments. In other embodiments, a different equation from Equation (1) can be used. The calculated ΔTave values are stored in an output file, having a specified file name, such as "xxx.tmiage0" in some embodiments. The calculated first average temperature change ΔTave values are sent from the data processing program 210 to the simulator 208.

At step 108, a second simulation of the integrated circuit is performed by the simulator 208 over a second time period using the first average temperature changes ΔTave of the devices received from the data processing program 210. The second simulation is also executed in the processor unit 206. The second time period can be the same as or different from the first time period. In some embodiments, the first time period is selected to be shorter than the second time period to reduce the total simulation time. For example, the first time period can be 100 ns and the second time period can be 500 ns in some embodiments.

For the second simulation, the first average temperature changes ΔTave calculated at step 106 are used to incorporate self-heating effect of devices. The average temperature change ΔTave values are stored in the output file as described above. In some embodiments the ΔTave values can be added to the ambient temperature setting in the input file for the second simulation. In some embodiments, at least one second input file 204 is received for the second simulation. In some embodiments, the input file 204 for the second simulation includes a model file and a connectivity file, similar to the first input file 204 for the first simulation. In some embodiments the second input file 204 is automatically generated by adding information about the output file of the first simulation to the first input file 204.

After the simulator 208 receives the second input file, the second simulation is performed. The second simulation data can be stored in the memory 212 unit and the second simulation results 216 can be shown by an output interface unit 214. The output interface unit 214 can be a display, a printer, or any other suitable output device.

In some embodiments, the second input file can be generated automatically based on the first input file and the first average temperature change ΔTave values. For example, the first input file can be modified to include the output file name where the first average temperature change ΔTave values are stored. Also, the second time period for simulation can be set to be the same as the first time period or changed according to a predefined rule.

The following description is provided for an exemplary input file, i.e., a connectivity file. In some embodiments, the connectivity file is a netlist. An exemplary netlist file for the first simulation is shown in the following with comments/descriptions marked by "**":

```
*** calculate average temperature and run simulation ***
.temp 25          ** the ambient temperature is 25 ° C. **
.lib 'model file.1'  TT_lib  ** to run a simulation, users may need to
include the model file and necessary libraries to describe device behavior.
The example model file name is 'model file.1' and the example library is
TT_lib **
.param tmiShe=1  ** tmiSHE=1 indicates to include a data processing
program to calculate average temperature change from self-heating effect
in this simulation **
Vds d0  0  0.85 ** Vds is a voltage source name, d0 and 0 are nodes,
and 0.85 is a voltage value (V) **
Vgs g0  0  pulse(0 '0.85'  '1ns'  '1ns'  '1ns'  '20ns'  '40ns')
**Vds is a voltage source name, g0 and 0 are nodes, and "pulse" is
followed by pulse signal parameters described below with respect to
FIG. 4 **
Vss s0  0  0 ** Vss is a voltage source name, s0 and 0 are nodes, and 0
is a voltage value (V) **
Vbs b0  0  0 ** Vbs is a voltage source name, b0 and 0 are nodes, and
0
is a voltage value (V) **
xmdut0 d0 g0 s0 b0  nch_svt_mac  w=0.922u  l=0.016u
** device name is nch_svt_mac with nodes d0, g0, s0, and b0. The width
and length of the device is 0.922 μm and 0.016 μm respectively. **
.tran 1n 500n      ** to run a transient simulation for a time interval
from
0 ns to 500 ns with a time step of 1 ns. **
.END
```

Figure 4:
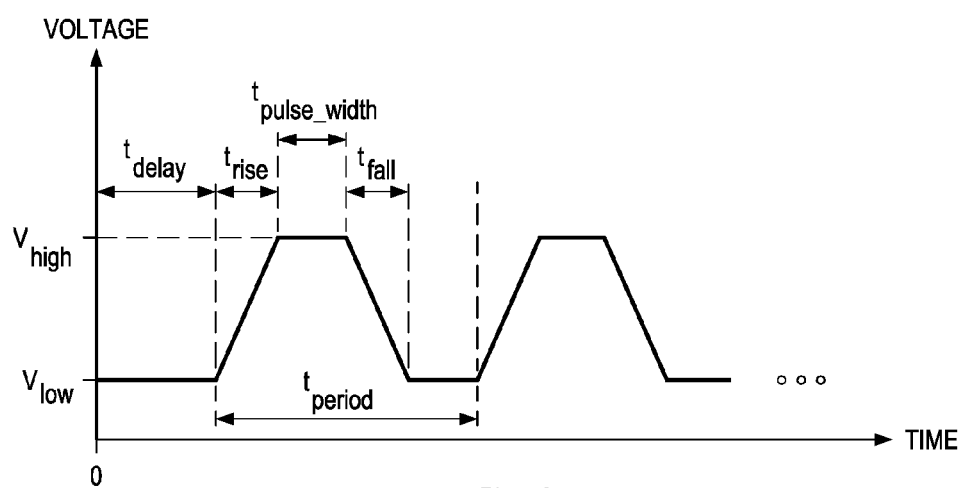
FIG. 4 is an exemplary voltage signal having multiple parameters that can be specified in an input file for the simulation.

FIG. 4 is an exemplary voltage signal having multiple parameters that can be specified in an input file for the simulation. The voltage signal is a pulse signal having a high voltage $V_{high}$, a low voltage $V_{low}$, a time period $t_{period}$, a delay time $t_{delay}$, a rise time $t_{rise}$, a pulse width time $t_{pulse\_width}$, and a pulse fall time $t_{fall}$. In the netlist above, the line "pulse (0 '0.85' '1 ns' '1 ns' '1 ns' '20 ns' '40 ns')" specifies a pulse signal having a low voltage as 0 V, high voltage as 0.85 V, a delay time as 1 ns, a rise time as 1 ns, a fall time as 1 ns, pulse width time as 20 ns, and a pulse period time as 40 ns.

After the first simulation is performed and the average temperature changes ΔTave of the devices are calculated, an exemplary netlist file for the second simulation is shown in the following with comments/descriptions marked by "**":

```
*** calculate average temperature and run simulation ***
.temp 25          ** the ambient temperature is 25 ° C. **
.lib 'model file.1'  TT_lib  ** to run a simulation, users may need to
include the model file and necessary libraries to describe device behavior.
The example model file name is 'model file.1' and the example library is
TT_lib **
.param tmiShe=1  ** tmiSHE=1 indicates to include a data processing
program to calculate average temperature change from self-heating effect
in this simulation **
.option tmiInput='example_step1.tmiage0'  ** The output file name
including the calculated average temperature change ΔTave values after
the first simulation is 'example_step1.tmiage0'**
Vds d0  0  0.85  ** Vds is a voltage source name, d0 and 0 are nodes,
and 0.85 is a voltage value (V) **
```

-continued

```
Vgs  g0  0  pulse(0 '0.85' '1ns' '1ns' '1ns' '20ns' '40ns') **Vds is a
voltage source name, g0 and 0 are nodes, and "pulse" is followed by pulse
signal parameters described in FIG. 4 **
Vss  s0  0  0   ** Vss is a voltage source name, s0 and 0 are nodes,
and 0 is a voltage value (V) **
Vbs  b0  0  0   ** Vbs is a voltage source name, b0 and 0 are nodes,
and 0 is a voltage value (V) **
xmdut0 d0 g0 s0 b0   nch_svt_mac   w = 0.922u   l=0.016u
** device name is nch_svt_mac with nodes d0, g0, s0, and b0. The width
and length of the device is 0.922 μm and 0.016 μm respectively. **
.tran 1n 500n ** to run a transient simulation for a time interval from 0 ns
to 500 ns with a time step of 1 ns. **
.END
```

The line starting with ".option" specifies the output file name including the calculated average temperature change ΔTave values after the first simulation is performed. In the example above, the output file name that includes the calculated average temperature change ΔTave values after the first simulation is 'example_step1.tmiage0'. The ΔTave values are loaded from the output file and included in the second simulation. In the example above, the second simulation is performed for a transient simulation with the second time period set to 500 ns. In some embodiments, the ΔTave values are added to the ambient temperature of each device. Thus the second simulation is performed including self-heating effect of the simulated device. The second simulation results 216 are sent to the output interface unit 214 and can be stored in the memory unit 212.

In some embodiments, the second simulation can be skipped if the calculated ΔTave values in the first simulation are determined to be insignificant compared to predefined values for a specific simulation purpose or application. In this case, the first simulation can be used for the simulation results and this method becomes a 1-step simulation process instead of a 2-step simulation process, because the second simulation is skipped.

In some embodiments, the second simulation data can be used to calculate second average temperature change ΔTave values by the data processing program 210 in a similar way as the first average temperature change ΔTave values are calculated using the first simulation data. The process can be repeated in iterations until the average temperature change ΔTave values converge or until a specified iteration number is reached in some embodiments.

At step 110 in FIG. 1, an integrated circuit layout is revised based on results of the second simulation in some embodiments. The revision of the integrated circuit layout depends on the specific layout, specification, and application, among many other considerations.

At step 112, an integrated circuit according to the revised layout is manufactured in some embodiments. The manufacturing of the integrated circuit will be performed by the manufacturing equipment 218 in FIG. 2 according to any available methods and processes, which will be understood by a person skilled in the art.

As described above, ΔTave for each device is calculated over the first time interval such as T0 in the disclosed method, instead of simulating the temperature change at every time point such as $t_0, t_1, t_2, \ldots, t_n$. In the second simulation, the calculated ΔTave of each device is loaded in the second simulation to modify the device temperature to emulate the self-heating effect. In some embodiments, the ΔTave values can be added to the ambient temperature setting in the input file 204 for the second simulation. The simulation results will include self-heating effect and/or other temperature effect.

Since temperature is already calculated over the first time interval of the first simulation and loaded into the second simulation, the disclosed method provides reduced simulation time with better convergence, because the temperature change is not simulated at every time point, such as $t_0$, $t_1$, $t_2$, ..., $t_n$. In contrast, some other method of calculating temperature change $\Delta T$ of each device at each time point, such as $t_0$, $t_1$, $t_2$, ..., $t_n$, can easily cause convergence issues or give abnormal results in addition to a longer simulation time. For example, the temperature change $\Delta T_i$ and current value $I_i$ at each time point $t_i$ has to be resolved simultaneously in the other method, which can give more than one solutions. These multiple solutions cause a convergence issue, which is known as an ill-conditioned simulation problem.

For example, for a simulation of an exemplary integrated circuit (a 3-stage NAND ring oscillator) using the disclosed method including the self-heating effect, the central processing unit (CPU) time of the processor unit 206 was 0.43 seconds, while the CPU time was 131.22 seconds using a conventional simulation method.

Also, the disclosed method doesn't depend on whether the device model used in the simulation includes self-heating effect or not, since the temperature change is calculated from power usage of each device. The method uses the user input information (e.g. input file 204) and the simulation data (e.g. simulated voltage and current) to calculate the $\Delta$Tave over a time interval. $\Delta$Tave is separately calculated from simulation data results and not involved in the simulation iteration at each time point such as $t_0$, $t_1$, $t_2$, ..., $t_n$.

Figure 5:
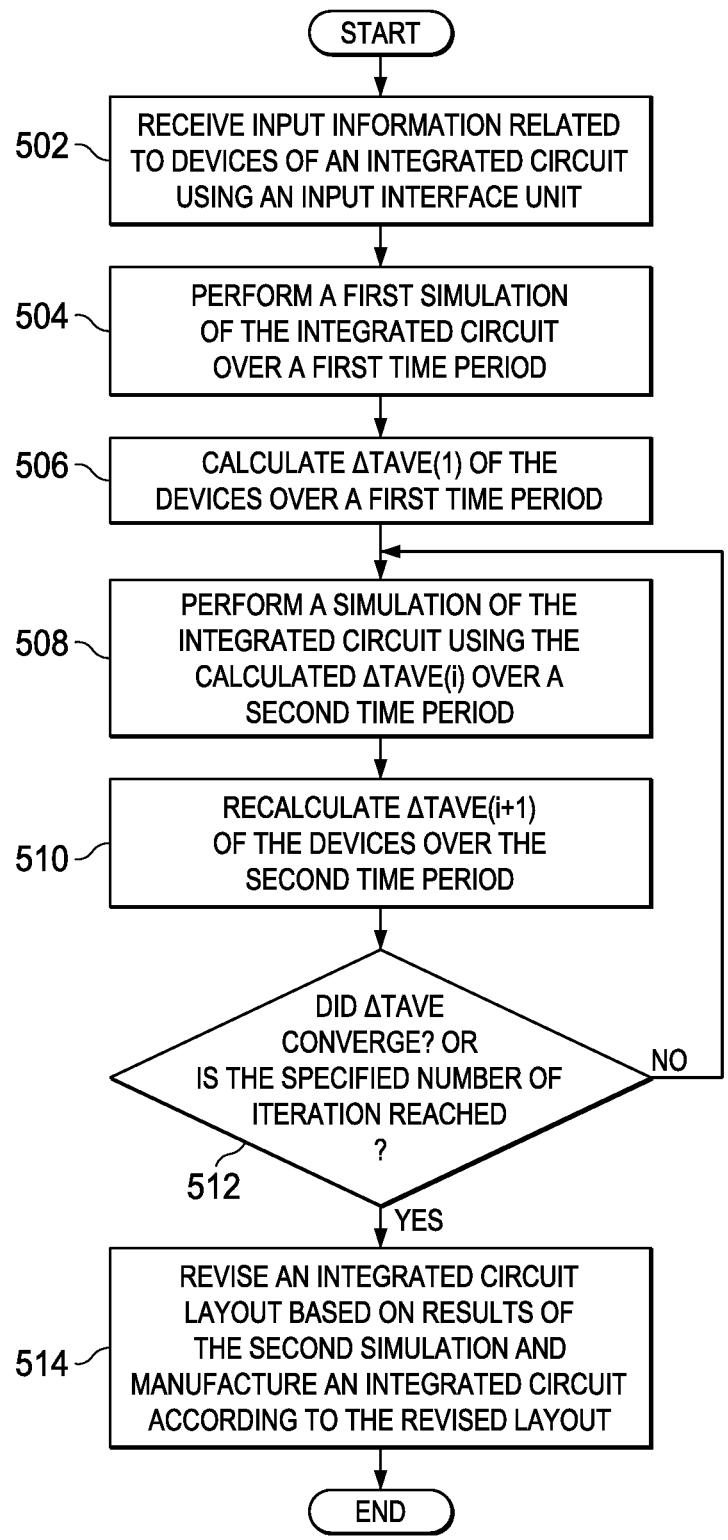
FIG. 5 is another exemplary flowchart of performing a simulation including self-heating effect in accordance with some embodiments.

FIG. 5 is another exemplary flowchart of performing a simulation including self-heating effect in accordance with some embodiments. The steps from 502 to 508 are similar to the steps from 102 to 108 of FIG. 1. At step 502, input information 204 related to devices of an integrated circuit (IC) is received using an input interface unit 202. At step 504, a first simulation of the integrated circuit is performed over a first time period using the simulator 208. The first simulation is executed in the processor unit 206. At step 506, first average temperature changes $\Delta$Tave(1) of the devices over the first time period are calculated. The calculation is executed in the processor unit 206. At step 508, another simulation of the integrated circuit is performed by the simulator 208 over a second time period using the first average temperature changes $\Delta$Tave(i) of the devices, where "i" indicates the iteration number based on the number of $\Delta$Tave calculations. The simulation is executed in the processor unit 206.

At step 510, average temperature changes $\Delta$Tave(i+1) of the devices are recalculated according to Equation (1) over the second time period. In some embodiments, a different equation can be used. The average temperature change $\Delta$Tave(i+1) is recalculated for each device in the IC. In some embodiments, the data processing program 210 arranged to calculate an average temperature change $\Delta$Tave is separate from the simulator 208 in some embodiments. The data processing program 210 is executed in the process unit 206 and the data processing program 210 can be encoded in a computer-readable medium such as a hard disk or can be accessed online via an internet in some embodiments. In other embodiments, the data processing program 210 arranged to calculate an average temperature change $\Delta$Tave can be incorporated to the simulator 208. The recalculated average temperature change $\Delta$Tave for each device is stored to an output file in the memory 212 for further processing in some embodiments.

At step 512, it is decided whether $\Delta$Tave values converged or the specified number of iteration is reached as described below. The decision is made in the processor unit 206. The convergence of $\Delta$Tave can be determined based on the difference of $\Delta$Tave values of each device among the last iterations. For example, the last two calculated $\Delta$Tave values of each device can be compared by calculating the difference Diff=|$\Delta$Tave(i+1)−$\Delta$Tave(i)| and determine if Diff is below a specified value. In another example, the iteration number of calculating $\Delta$Tave can be specified, such as 2 calculations, 3 calculations, and so on.

If any of these conditions (whether $\Delta$Tave values converged or the specified number of iteration is reached) are not met, then the process goes back to the step 508 to perform the next simulation using the last calculated $\Delta$Tave values. The simulation is executed in the processor unit 206. The process repeats steps 508-510 until at least one of the conditions (whether $\Delta$Tave values converged or the specified number of iteration is reached) is met in some embodiments. The final $\Delta$Tave values and simulation results 216 are shown in the output interface unit 214 and the final simulation data can be stored in the memory unit 212. Even though the step 508 uses the second time period for simulation, a different time period or the same time period for some iteration can be specified in some embodiments. For example, a third simulation of the integrated circuit can be performed over a third time period using the second average temperature changes of the devices.

In some embodiments, if any of the conditions at step 512 (whether $\Delta$Tave values converged or the specified number of iteration is reached) is satisfied, the process moves on to step 514. (In some other embodiments, the simulation process is complete.)

At step 514 in FIG. 5, an integrated circuit layout is revised based on results of the simulation and an integrated circuit according to the revised layout is manufactured in some embodiments. The revision of the integrated circuit layout depends on the specific layout, specification, and application, among many other considerations. The manufacturing of the integrated circuit will be performed by the manufacturing equipment 218 in FIG. 2 according to any available methods and processes, which will be understood by a person skilled in the art.

The method described above with respect to FIG. 5 can be carried out automatically with appropriate settings, such as input file name, simulation time, number of iteration, etc.) pre-defined, or a user can manually provide input file 204 and/or check the results after each iteration.

Figure 6A:
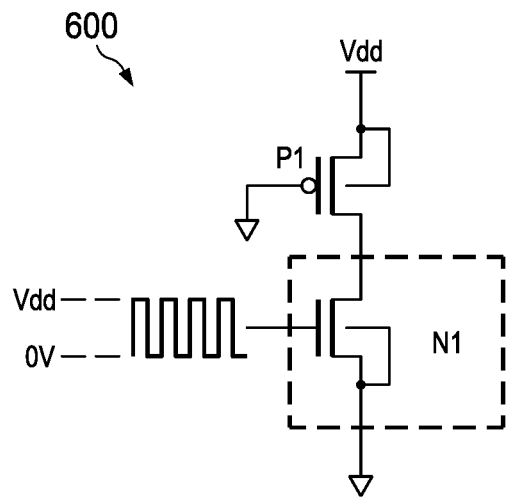
FIG. 6A is an exemplary integrated circuit used to calculate an average temperature change ΔTave of FIG. 5B in accordance with some embodiments.

As described above, the initial $\Delta$Tave values are calculated over the first time period by using the first simulation data. In subsequent iterations, the $\Delta$Tave of each device is recalculated until either the $\Delta$Tave values converge or a specified number of iterations are completed. The simulation results will include self-heating effect and/or other temperature effect. It is found that the $\Delta$Tave values converge with relatively little change in a few iterations, such as 1 or 2 iteration(s). In contrast, some other method of calculating temperature change $\Delta T$ of each device at each time point can easily cause convergence issues or give abnormal results. For example, the temperature change $\Delta T_i$ and current value $I_i$ at each time point $t_i$ has to be resolved simultaneously in the other method, which can give more than one solutions. These multiple solutions cause a convergence issue, which is known as an ill-conditioned simulation problem. FIG. 6A is an exemplary integrated circuit 600 used to calculate an average temperature change $\Delta$Tave of FIG. 6B in accordance with some embodiments. The integrated circuit 600 including an NMOS transistor N1 coupled to a power supply voltage Vdd through a PMOS transistor P1 was simulated using the method described above in one example.

Figure 6B:
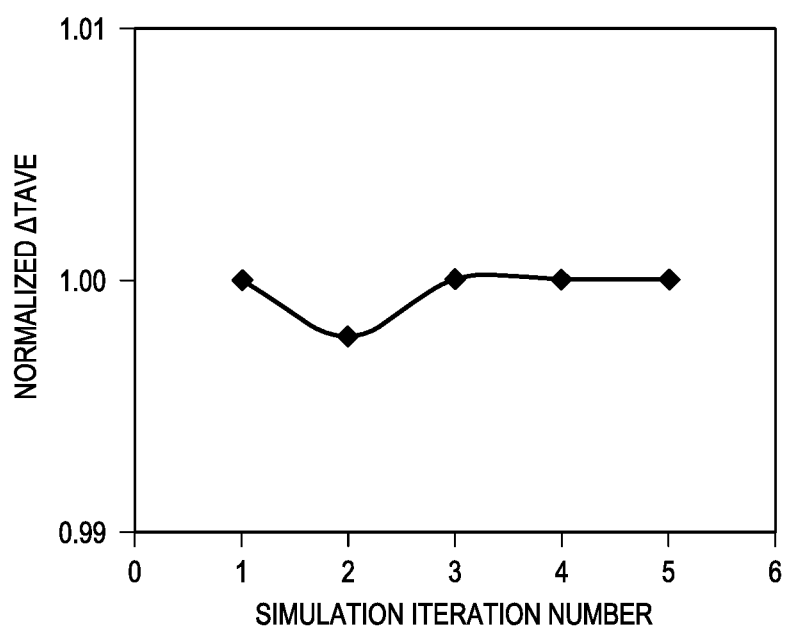
FIG. 6B is an exemplary plot of normalized average temperature change ΔTave vs. simulation iteration number in accordance with some embodiments.

FIG. 6B is a plot of normalized average temperature change ΔTave vs. simulation iteration number in accordance with some embodiments. The calculated ΔTave of the NMOS transistor N1 in FIG. 6A is very close to the converged ΔTave value after 5 iterations. As shown, the first ΔTave is almost the same as the third, fourth, and fifth ΔTave values. The second ΔTave value shows a little deviation from the other values, but still within about 0.25% of the converged value according to the plot in FIG. 6B.

In some embodiments of the present disclosure, an average temperature change ΔTave for each device is calculated over the first time interval of the first simulation, instead of simulating the temperature change ΔT at every time point such as $t_0, t_1, t_2, \ldots, t_n$. In the second simulation, the calculated ΔTave of each device is loaded in the second simulation to include the device temperature change in order to emulate the self-heating effect. The simulation results will include self-heating effect and/or other temperature effect.

Since the average temperature change is already calculated after the first simulation and loaded in the second simulation, the described method reduces simulation time with better convergence in some embodiments, because the temperature change is not simulated at every time point, such as $t_0, t_1, t_2, \ldots, t_n$. In contrast, a conventional method of calculating temperature change ΔT of each device at each time point can easily cause convergence issues or give abnormal results, as explained above.

According to some embodiments, a method of performing simulation includes receiving input information related to devices of an integrated circuit. A first simulation of the integrated circuit is performed over a first time period. The first simulation is executed by a processor unit. Average temperature changes of the devices over the first time period are calculated. A second simulation of the integrated circuit is performed over a second time period using the average temperature changes of the devices. The second simulation is executed in the processor unit.

According to some embodiments, an apparatus includes a computer-readable medium encoded with a computer program. The computer program, when executed, performs steps including receiving input information related to devices of an integrated circuit. A first simulation of the integrated circuit is performed over a first time period. Average temperature changes of the devices over the first time period are calculated. A second simulation of the integrated circuit is performed over a second time period using the average temperature changes of the devices.

According to some embodiments, a system for performing simulation includes an input interface unit configured to receive input information related to devices of an integrated circuit. A processor unit is configured to perform steps that include performing a first simulation of the integrated circuit over a first time period. Average temperature changes of the devices over the first time period are calculated. A second simulation of the integrated circuit is performed over a second time period using the average temperature changes of the devices.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
receiving first input information related to devices of an integrated circuit;
performing a first simulation of the integrated circuit over a first time period, wherein the first simulation is executed by a processor unit;
calculating first average temperature changes of the devices over the first time period based on information from the first simulation;
performing one or more subsequent simulations of the integrated circuit over one or more subsequent time periods using the first average temperature changes of the devices, wherein the subsequent simulations are executed by the processor unit;
calculating one or more subsequent average temperature changes of the devices over the subsequent time periods based on information from the subsequent simulations, wherein the subsequent simulations are iteratively performed and the subsequent average temperature changes are iteratively calculated until a predetermined quantity of iterations are reached;
revising an integrated circuit layout based on results of the subsequent simulations; and
manufacturing the integrated circuit according to the revised integrated circuit layout,
wherein each average temperature change of the first average temperature changes is calculated according to:

$$\Delta Tave = \left( \frac{\sum_{i=1}^{n} I_i \cdot V_i \cdot \Delta t_i}{\sum_{i=1}^{n} \Delta t_i} \right) \times Rth,$$

wherein ΔTave is the average temperature change, $\Delta t_i$ is an i-th time section, $I_i$ is an i-th current value, $V_i$ is an i-th voltage value, n is a positive integer, and Rth is a constant with a unit of °C./W.

2. The method of claim 1, wherein the calculating the subsequent average temperature changes of the devices over the subsequent time periods comprises:
performing a second simulation of the of the integrated circuit over a second time period of the subsequent time periods using the first average temperature changes of the devices, wherein the subsequent simulations are executed by the processor unit; and
calculating second average temperature changes of the devices over the second time period.

3. The method of claim 2, wherein the calculating the subsequent average temperature changes of the devices over the subsequent time periods further comprises:
performing a third simulation of the integrated circuit over a third time period using the second average temperature changes of the devices, wherein the third simulation is executed in the processor unit.

4. The method of claim 1, wherein the first input information is stored in at least one first input file, the at least one first input file includes a model file and a connectivity file, the model file defines behaviors of the devices, and the connectivity file defines connections of the devices.

5. The method of claim 4, wherein the connectivity file is a netlist.

6. The method of claim 1, further comprising storing the calculated first average temperature changes in an output file.

7. The method of claim 6, further comprising generating a second input file by including an output file name.

8. The method of claim 1, wherein calculating the first average temperature changes is performed by a data processing program separate from a simulation program that is performing the first simulation.

9. The method of claim 8, further comprising sending, by the simulation program, first simulation data to the data processing program to calculate the first average temperature changes.

10. The method of claim 9, further comprising receiving, by the simulation program, the first average temperature changes from the data processing program.

11. An apparatus comprising:
a processor; and
a non-transitory computer-readable medium storing a computer program that, when executed by the processor, performs steps including:
receiving first input information related to devices of an integrated circuit;
performing a first simulation of the integrated circuit over a first time period;
calculating first average temperature changes of the devices over the first time period; and
performing one or more subsequent simulations of the integrated circuit over one or more subsequent time periods using the first average temperature changes of the devices;
calculating one or more subsequent average temperature changes of the devices over the subsequent time periods based on information from the subsequent simulations, wherein the subsequent simulations are iteratively performed and the subsequent average temperature changes are iteratively calculated until a predetermined quantity of iterations are reached;
revising an integrated circuit layout based on results of the subsequent simulations; and
manufacturing the integrated circuit according to the revised integrated circuit layout,
wherein each average temperature change of the first average temperature changes is calculated according to the equation:

$$\Delta Tave = \left( \frac{\sum_{i=1}^{n} I_i \cdot V_i \cdot \Delta t_i}{\sum_{i=1}^{n} \Delta t_i} \right) \times Rth,$$

wherein $\Delta Tave$ is the average temperature change, $\Delta t_i$ is an i-th time section, $I_i$ is an i-th current value, $V_i$ is an i-th voltage value, n is a positive integer, and Rth is a constant with a unit of ° C./W.

12. The apparatus of claim 11, wherein the step for calculating the subsequent average temperature changes of the devices over the subsequent time periods includes steps for:
performing a second simulation of the of the integrated circuit over a second time period of the subsequent time periods using the first average temperature changes of the devices; and
calculating second average temperature changes of the devices over the second time period.

13. The apparatus of claim 12, wherein the step for calculating the subsequent average temperature changes of the devices over the subsequent time periods further includes steps for:
performing a third simulation of the integrated circuit over a third time period using the second average temperature changes of the devices.

14. The apparatus of claim 11, wherein the steps further include receiving at least one second input file for the subsequent simulations.

15. The apparatus of claim 11, wherein the first input information comprises a model file and a connectivity file, the model file defines behaviors of the devices, and the connectivity file defines connections of the devices.

16. A system, comprising:
an input interface unit configured to receive input information related to devices of an integrated circuit;
a processor unit configured to perform steps that include:
performing a first simulation of the integrated circuit over a first time period;
calculating first average temperature changes of the devices over the first time period based on information from the first simulation;
performing one or more subsequent simulations of the integrated circuit over one or more subsequent time periods using the first average temperature changes of the devices;
calculating one or more subsequent average temperature changes of the devices over the subsequent time periods based on information from the subsequent simulations, wherein the subsequent simulations are iteratively performed and the subsequent average temperature changes are iteratively calculated until a predetermined quantity of iterations are reached; and
revising an integrated circuit layout based on results of the subsequent simulations; and
equipment configured to manufacture the integrated circuit according to the revised integrated circuit layout,
wherein each average temperature change of the first average temperature changes is calculated according to the equation:

$$\Delta Tave = \left( \frac{\sum_{i=1}^{n} I_i \cdot V_i \cdot \Delta t_i}{\sum_{i=1}^{n} \Delta t_i} \right) \times Rth,$$

wherein $\Delta Tave$ is the average temperature change, $\Delta t_i$ is an i-th time section, $I_i$ is an i-th current value, $V_i$ is an i-th voltage value, n is a positive integer, and Rth is a constant with a unit of ° C./W.

17. The system of claim 16, wherein the step for performing one or more subsequent simulations of the integrated circuit over one or more subsequent time periods includes steps for:
performing a second simulation of the of the integrated circuit over a second time period of the subsequent time periods using the first average temperature changes of the devices;

calculating second average temperature changes of the devices over the second time period; and performing a third simulation of the integrated circuit over a third time period using the second average temperature changes of the devices.

\* \* \* \* \*